US005120941A

United States Patent [19]

Reilley et al.

[11] Patent Number: 5,120,941

[45] Date of Patent: Jun. 9, 1992

[54] SELF-SERVICE SALES SYSTEM FOR LARGE CONTAINERS USING BAR CODED PEEL-OFF LABELS

[75] Inventors: John P. Reilley, Laguna Beach, Calif.; Martin D. MacDowell, St. Charles, Mo.

[73] Assignee: Ralston Purina Company, St. Louis, Mo.

[21] Appl. No.: 271,949

[22] Filed: Nov. 15, 1988

[51] Int. Cl.[5] .......................... G06F 7/08; B61B 3/00; B42D 5/00; B42D 15/00

[52] U.S. Cl. .................................... 235/375; 238/381; 186/52; 40/642; 281/44; 283/81; 283/101

[58] Field of Search ........................ 235/375, 383, 385; 40/642, 650; 186/52; 211/45, 50, 190, 191; 281/44; 283/56, 81, 101, 117

[56] References Cited

U.S. PATENT DOCUMENTS

| | | | |
|---|---|---|---|
| 1,925,603 | 9/1933 | Reiher | 40/650 |
| 1,929,468 | 10/1933 | Bales et al. | 40/650 |
| 3,959,624 | 5/1976 | Kaslow | 235/463 |
| 4,285,426 | 8/1981 | Cahill | 194/209 |
| 4,340,810 | 7/1982 | Glass | 235/375 |
| 4,420,082 | 12/1983 | Bernie | 206/526 |
| 4,554,446 | 11/1985 | Murphy et al. | 235/487 |
| 4,558,212 | 12/1985 | Hampson | 235/383 |
| 4,634,147 | 1/1987 | McClure | 283/56 |
| 4,676,343 | 6/1987 | Humble et al. | 186/61 |
| 4,688,026 | 8/1987 | Scribner et al. | 340/572 |
| 4,693,441 | 9/1987 | Conway | 248/225.1 |
| 4,716,669 | 1/1988 | Fast | 40/650 |
| 4,735,290 | 4/1988 | Byrley | 186/52 |

*Primary Examiner*—Stuart S. Levy
*Assistant Examiner*—Edward Sikorski
*Attorney, Agent, or Firm*—Virgil B. Hill

[57] ABSTRACT

A self-service sales system for large containers such as pet food bags and the like includes a fixture having a plurality of container or bag shelves. A price channel positioned at each of the shelves contains product identification and marketing information. In addition, a plurality of Universal Product Code (UPC) symbol pads are fixed to the price channels. The symbol pads are attached by an adhesive coated foam strip. The pad contains a plurality of removable sheets, each of which are imprinted with a product description and UPC code. The purchaser may remove a sheet corresponding to each product to be purchased. The sheets are taken to the checkout counter where the UPC code is read. After payment for the product, the retailer retrieves the product for the customer.

4 Claims, 1 Drawing Sheet

SELF-SERVICE SALES SYSTEM FOR LARGE CONTAINERS USING BAR CODED PEEL-OFF LABELS

BACKGROUND OF THE INVENTION

The present invention relates to merchandising systems and more particularly to a unique sales system for large containers, bags and the like.

Typical supermarkets or retail outlets include a plurality of fixtures or shelving for product display and storage. The fixtures include price channels which receive product description and price information. Generally, each product includes a label having a Universal Product Code (UPC) imprinted thereon. UPC supermarket systems are used with direct bagging check stands. Customers make their selections and place the products into a shopping cart. Checkout stands include a conveyor table, an optical scanner and a terminal. The optical scanner examines the UPC symbols printed on the items as they are pulled across a scanner window. The terminal in response to signals from the scanner automatically retrieves a product description and price. The terminal calculates the total charge, tax and change and prints a customer receipt on a tape. Such systems also include a keyboard which permits manual keying of product number and price or product information. An example of such a system may be found in U.S. Pat. No. 3,959,624 entitled CODED MERCHANDISING COUPON and issued on May 25, 1976 to Kaslow.

Problems are encountered with the retailing of large containers such as 25 pound and 50 pound bags of pet food, cat litter and the like. The bags are heavy and bulky. The product is difficult for the average customer to pick up and place in a shopping cart. Once brought to the checkout counter, difficulties are experienced with using a UPC symbol printed on the container. The product number or price must be manually entered at the UPC terminal. The bulkiness and weight of the product creates an inherent barrier to purchase. Due to the product size, customer assistance is generally necessary.

A need exists for an improved sales system providing enhanced large bag or container retail merchandising presentation, which will improve inventory-to-sales stock ratio, reduce out-of-stock situations and result in an increased sales experience and accurate sales data due to the UPC tracking system.

SUMMARY OF THE INVENTION

In accordance with the present invention, the aforementioned needs are substantially fulfilled. Essentially, the present invention includes a display or sales fixture including a shelf or platform for supporting a plurality of large containers, bags and the like. A price channel is affixed to the fixture adjacent the shelf. The price channel contains product identification and pricing information. A UPC symbol pad is fixed to the price channel. The pad includes a plurality of removable sheets containing a product description and a corresponding UPC code. The merchandising system allows the customer to select the product, remove one of the UPC sheets and take only the sheet to the checkout counter. The UPC sheet is easily read by the optical scanner at the checkout counter. The retailer can then retrieve and deliver the product to the customer's vehicle. The retailer can provide the service in conjunction with normal curb pickup or lot delivery services. The inherent barriers to bulk purchase of product are eliminated. The customer therefore obtains the benefits of reduced price normally associated with bulk purchase and sales are enhanced. The retailer can insure a more accurate control over inventory since personnel of the retailer are removing the stock from the display fixture. Out-of-stock situations are reduced or eliminated. In addition, the customer no longer has to wrestle with the heavy containers to remove them from a display shelf, place them into a shopping cart and/or carry them to the checkout counter and subsequently to their vehicle.

DETAILED DESCRIPTION OF THE PREFERRED EMBODIMENT

Figure 1:
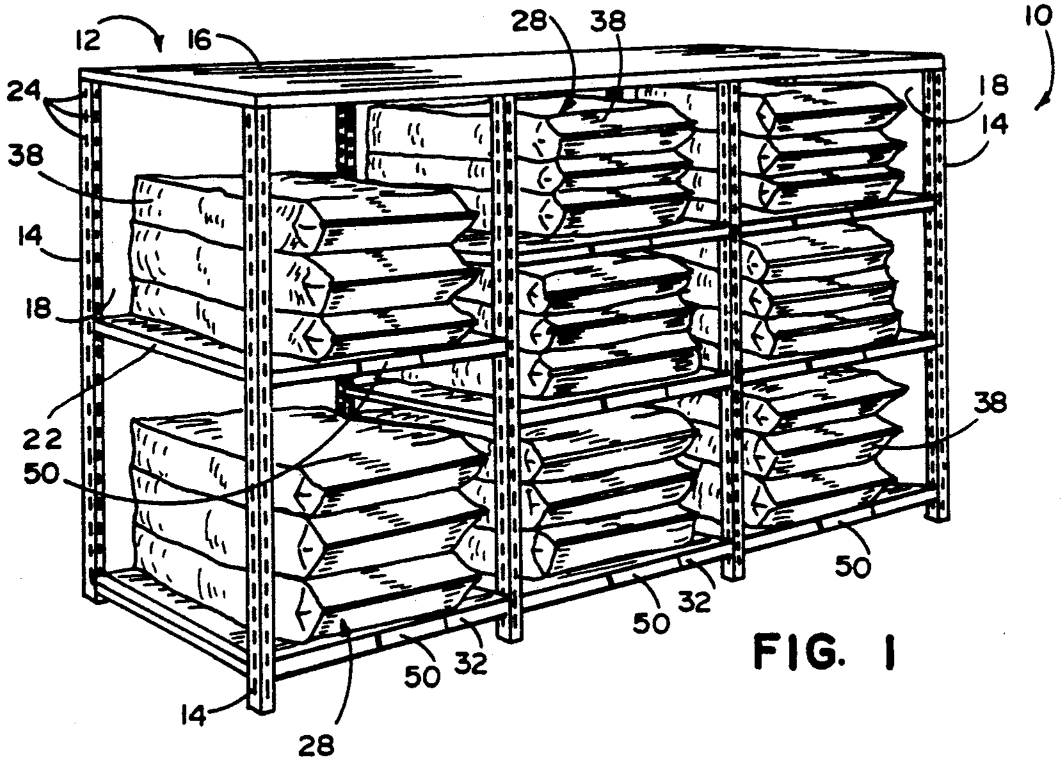
FIG. 1 is a front, perspective elevation of a display fixture incorporating the sales system in accordance with the present invention.

A self-service sales system in accordance with the present invention is illustrated in FIG. 1 and generally designated by the numeral 10. System 10 includes a display or storage rack or fixture 12. In the preferred form, fixture 12 includes a plurality of vertical uprights 14, a top 16 and open sides 18. Adjustably supported between uprights 14 are product support shelves 22. As shown in FIG. 1, uprights 14 are provided with vertically spaced slots 24. Shelves 22, in a conventional fashion, include suspension hooks or tabs which are received within the slots 24. As a result, a plurality of different size compartments or bins 28 capable of accommodating different size containers are defined by the fixture 12.

Positioned along the front of each of the shelves 22 is a price channel member 32. In a conventional fashion, price channel member 32 contains product description and pricing information. Each price channel 32 also supports a Universal Product Code symbol pad 50.

Each of shelves within the respective bin or compartment 28 supports large containers or bags 38. The containers may be of different sizes such as 25 pound, 50 pound and 75 pound sizes. The bin sizes may be varied in vertical height to accommodate more bags of the higher demand product. The fixture is capable of displaying many different products to the customer including pet foods, cat litter and the like.

Figure 2:
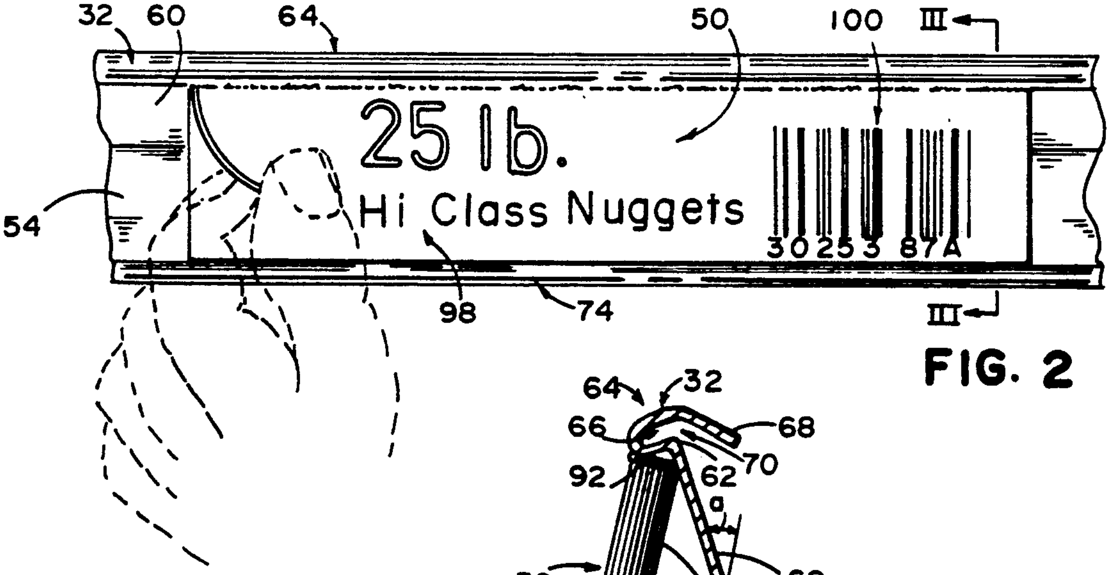
FIG. 2 is an enlarged, fragmentary, front elevational view of a price channel in accordance with the present invention.
Figure 3:
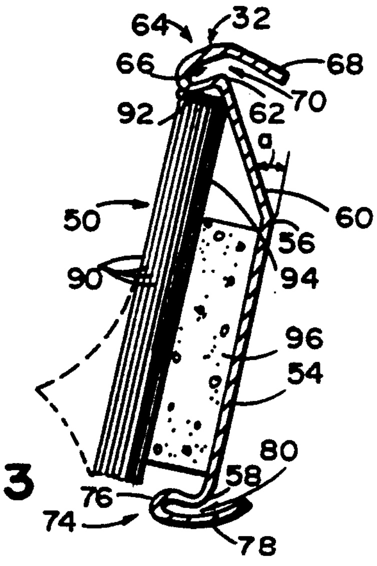
FIG. 3 is a cross-sectional view taken generally along line III—III of FIG. 2.

As seen in FIGS. 2 and 3, price channel 32 is an elongated member. It is preferably formed from a sheet metal employing a roll forming process. Channel 32 includes a planar base portion 54 having an upper edge 56 and a lower edge 58. A forwardly angled, upper, planar portion 60 is joined with and formed integral with upper edge 56. Portion 60 extends at an angle "a" of approximately 30° with respect to portion 54. Extending along and formed integral with an upper edge 62 of portion 60 is a configured top flange 64. Top flange 64 is reverse bent to define a forward bead 66 and a rearwardly extending flange portion 68. Flange 64 defines a rearwardly opening channel 70. Formed integral with lower edge 58 of base portion 54 is a lower flange 74. Flange 74 is reverse bent and also defines a forward bead 76 and a rearwardly extending flange portion 78. Flange 74 defines a rearwardly opening channel 80.

In a conventional fashion, price channel 32 at edges 58 and 62 receives and supports flexible pricing cards. In addition, base portion 54 defines a flat surface which is positioned for ease of viewing by the customer. A pricing or other merchandising and product information label may also be applied to this surface.

The UPC symbol pad 50, as also seen in FIGS. 2 and 3, includes a plurality of removable sheets 90. The individual sheets are held by a suitable adhesive or glue binding 92 along the upper edge of the pad. A rearmost sheet 94 is secured to an adhesive coated, foam pad or attachment strip 96. Strip 96 has pressure sensitive adhesive applied to its front and back surfaces. The strip is pressed against portion 54 to secure the UPC symbol pad to the price channel. As seen in FIGS. 2 and 3, foam strip 96 is dimensioned to position the lowermost edge of the bottom sheet 94 outwardly from beads 76 of lower flange 74. As a result, all of the sheets are positioned so that the customer may easily tear or remove an individual sheet from the pad. Pad 50 extends from a point adjacent flange 74 to flange 64. Each sheet 90 includes a product description 98 and a UPC symbol 100. The UPC symbol is read by the optical scanner at the checkout stand in a normal fashion.

In use, the retailer positions the display or storage fixture at a convenient point in the store. Since the retailer will remove the product from the fixture, it will normally be placed near a store exit associated with a curb pickup lane. Suitable product 38 is placed on the individual shelves. The appropriate UPC symbol pads are positioned on the shelves employing the pressure sensitive adhesive pads 96. The customer is presented with a visual presentation for the individual product which is improved over pallet stacks and other arrangements previously used. The customer can easily see the product and readily make his selection. The customer need not, however, physically remove the product from the storage shelves and take it to the checkout counter. The customer removes one of the sheets from the appropriate UPC symbol pad. The sheet is presented at the checkout counter. The checker will read the sheet using the optical scanner. A bag person or other assistant can retrieve the appropriate product from the display fixture 12 and deliver the product to the customer's vehicle.

The unique large container or bag sales system in accordance with the present invention eliminates the inherent resistance to purchase of bulk products heretofore experienced. The system makes the purchase of heavy and bulky product substantially easier. The system reduces brand out-of-stock situations and provides an improved visual presentation to the customer. The system increases sales over prior approaches.

In view of the foregoing description, those of ordinary skill in the art will undoubtedly envision various modifications which would not depart from the inventive concepts disclosed herein. It is expressly intended, therefore, that the above description should be considered as only that of the preferred embodiment. The true spirit and scope of the present invention may be determined by reference to the appended claims.

The embodiments of the invention in which an exclusive property or privilege is claimed are defined as follows:

1. A merchandising system for large containers, comprising:
- a rack for the storage and display of a plurality of large, bulk containers, said rack including a plurality of shelves for supporting a plurality of product containers of different size and type;
- a UPC symbol pad including a plurality of manually removable individual sheets, each sheet having product information and a UPC symbol thereon; and
- attachment means engaging said pad for attaching said pad to said rack, said attachment means comprising:
- an elongated price channel which defines a generally planar base portion, an upper edge with a forwardly extending top flange, and a lower edge with a forwardly extending bottom flange; and
- an adhesive strip secured to said pad and said planar base portion of said channel, said strip being dimensioned to position said pad on and within said price channel with the sheets spaced from the planar base and positioned outwardly from the lower edge of said channel and forwardly of the bottom flange thereof for ease of removal of said sheets.

2. A merchandising system as defined by claim 1 wherein said flanges define forwardly facing beads and a forwardly angled upper portion joined to said base portion.

3. A merchandising system as defined in claim 1 wherein said system includes additional UPC symbol pads and attachment means associated with each of said products.

4. A self-service sales system for large containers, such as pet food bags and the like which contain product, said system comprising:
- a storage fixture defining a plurality of container shelves for supporting a plurality of large containers;
- a plurality of price channels, each positioned along one of said shelves, each price channel providing product identification and price information, each of said price channels being an elongated member defining a planar base having an upper edge and a lower edge, an upper portion integral with said upper edge, a reverse bent configured upper flange joined to said upper portion and extending forwardly thereof and a reverse bent configured lower flange integral with the lower edge of said planar base and extending forwardly thereof; and
- a plurality of UPC symbol pads, each pad disposed within and fixed to one of said price channels, said pads including a plurality of removable sheets containing a product description and a corresponding UPC symbol for the product in the large containers, wherein each of said UPC symbol pads further includes an adhesive coated foam attachment strip engaging said planar base of one of said price channels and a bottom one of said removable sheets, said upper and lower flanges being dimensioned such that said sheets extend from a point adjacent and forward of said lower flange to said upper flange of said one of said price channels, and wherein said foam attachment strip has sufficient thickness such that it extends forward of the reverse bent lower flange to position said removable sheets forward of said lower flange to facilitate removal of said sheets by a customer.

* * * * *